United States Patent [19]

Ohe et al.

[11] Patent Number: 5,026,965
[45] Date of Patent: Jun. 25, 1991

[54] METHOD OF AND APPARATUS FOR MANUFACTURING TUBE HAVING HOLES

[75] Inventors: Tatsuya Ohe; Mitsuaki Fujimura, both of Kuga, Japan

[73] Assignee: Mitsui Petrochemical Industries, Ltd., Tokyo, Japan

[21] Appl. No.: 458,424

[22] Filed: Dec. 28, 1989

[30] Foreign Application Priority Data

Dec. 28, 1988 [JP] Japan ................... 63-332368

[51] Int. Cl.⁵ .............................................. B23K 26/00
[52] U.S. Cl. ......................... 219/121.70; 219/121.71; 219/121.82

[58] Field of Search ........... 219/121.7, 121.71, 121.82, 219/121.6, 121.85

[56] References Cited

U.S. PATENT DOCUMENTS 4,028,525 6/1977 Mominee et al. ................ 219/121.7

Primary Examiner—C. L. Albritton
Attorney, Agent, or Firm—Sherman & Shalloway

[57] ABSTRACT

It is an object of the present invention to provide a tube with precise holes. The side of a tube is drilled at predetermined intervals by a laser beam while the tube is being conveyed in its longitudinal direction in a tubular state. In consequence, manufacture is facilitated, and the precise holes can be drilled.

19 Claims, 4 Drawing Sheets

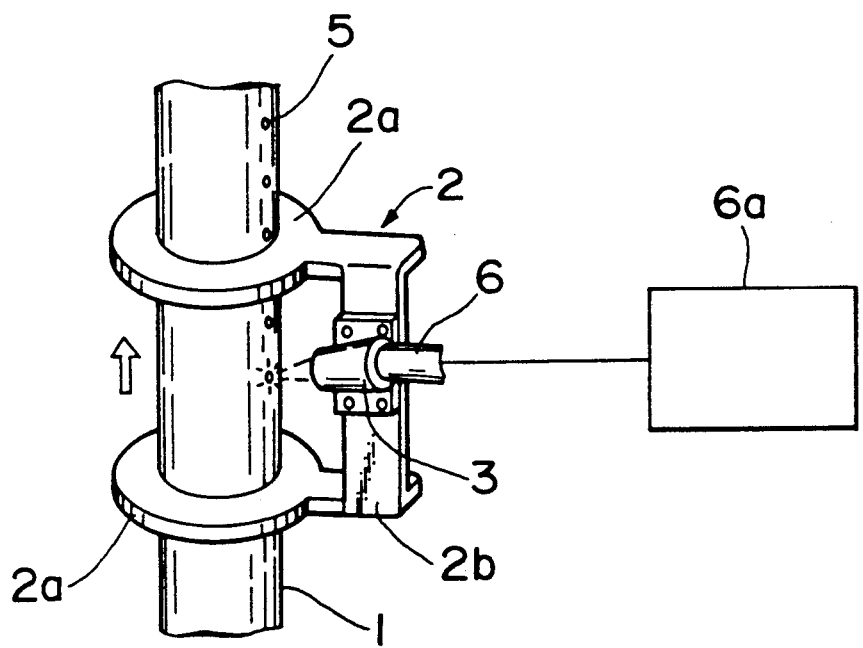
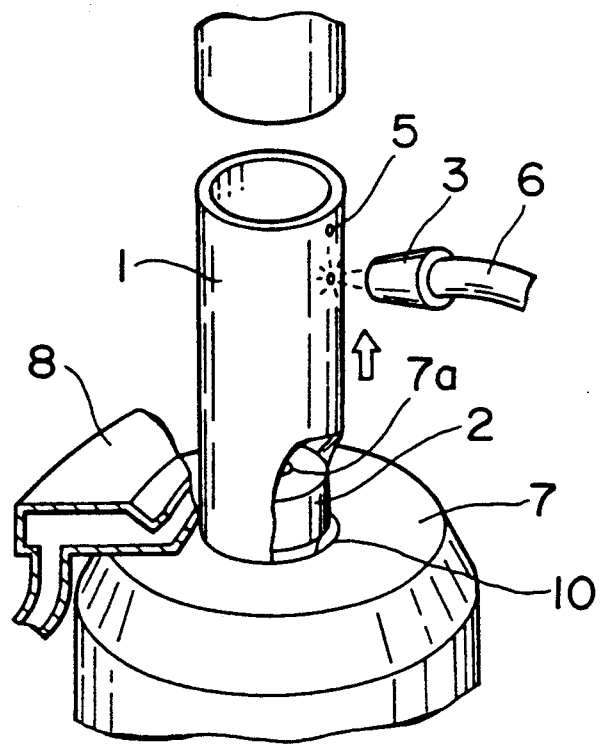

METHOD OF AND APPARATUS FOR MANUFACTURING TUBE HAVING HOLES

BACKGROUND OF THE INVENTION

1. Field of the Invention:

The present invention relates to a method of and an apparatus for manufacturing a tube having holes, more particularly, which is suitable for use in irrigation or sprinkling.

2. Description of the Related Art:

Conventional tubes having holes have a large number of small holes formed in its longitudinal direction on a half side thereof. Such tubes having holes are widely used for sprinkling water or spraying liquid fertilizer over vegetables, fruits or flowers.

Manufacture of such a tube is not very difficult; it can be easily manufactured by forcing a synthetic resin through the cylindrical orifice of a die. However, drilling small holes only on one side of the continuous tube manufactured is not easy.

Conventionally, a tube having holes is manufactured by preparing a first synthetic resin tape with a large number of holes drilled in it and a second synthetic resin tape having the same shape but no holes in it and then by sticking the edges of the first tape to the edges of the second tape to form a continuous tube. The first tape is drilled mechanically by punching or using a laser beam.

However, the tube having holes manufactured in the above-described method has a disadvantage in that it may rupture at its seams when a hydraulic pressure is applied thereto. Furthermore, it is not easy to mass produce the above-described type of tube.

Accordingly, it has been proposed to drill a seamless tube manufactured by the extrusion by folding the seamless tube into two and then notching the folded edge of the tube in a semicircular form at predetermined intervals. The semicircular notches formed become circular holes when the seamless tube is unfolded. However, it is very difficult to notch the edge of the folded tube in the same semicircular form, and this makes it difficult for substantially circular holes to be formed in an unfolded tube, causing the areas of the openings of the individual holes to vary from each other.

When drilling is conducted using a laser beam, as stated above, the laser beam is condensed by a lens so as to achieve a high energy level required for local processing, and the condensed laser beam is focused on the surface of a tube. The depth of a hole that can be formed by the laser beam is about ±2 mm.

It is therefore required that the relative distance between the tube and a laser beam irradiating portion be maintained precisely at a value less than the above-described depth, and preferably, at ±0.5 mm or less. However, no adequate method of maintaining this precision is known, and drilling failure often occurs.

SUMMARY OF THE INVENTION

An object of the present invention is to provide a tube with precise holes, and a method and an apparatus for manufacturing such a tube.

According to the present invention, there is provided a method of manufacturing a tube having holes which comprises a step of continuously drilling holes in a side of the tube at predetermined intervals by a laser beam focused thereon while the tube is being conveyed in its longitudinal direction in a tubular state.

It is not necessary for the tube obtained to be colored in black and non-black in drilled and undrilled portions, respectively. However, it may have black and non-black portions. Alternatively, it may be black alone. In the latter case, the synthetic resin that forms the tube may contain at least 0.5 wt% of carbon black as a coloring agent.

A laser beam generating device for irradiating the side of the tube with a laser beam employs an excited material substantially formed of yttrium aluminum garnet crystals. Upon excitation by light, the excited material emits near infrared rays of light. Alternatively, other types of laser beam generating devices may also be used.

An apparatus for manufacturing a tube having holes according to the present invention includes a tube retainer for retaining a tube in a tubular state, at least one of laser beam irradiating portion disposed on the side of the tube retainer in such a manner that a laser beam emitted from the laser beam irradiating portion is focused on the surface of the tube, and a tube conveying portion for conveying the tube in its longitudinal direction.

In the apparatus for manufacturing a tube having holes according to the present invention, a tube is drilled at intervals of 2.5 cm by conveying the tube to be drilled at a speed of, for example, 10 cm/sec and by irradiating a laser beam at frequencies of 4 times per second. In other words, a desired drilling is possible by adequately setting the output of the laser beam, the time during which the laser beam is irradiated, and the number of laser beam irradiating portions.

BRIEF DESCRIPTION OF THE DRAWINGS

FIGS. 1 to 5 are examples of a drilling apparatus, in which:

FIG. 1 is a perspective view of an example of a drilling apparatus;

FIG. 2 is a perspective view of example 2 of the drilling apparatus;

FIG. 3 is a perspective view, with parts broken away, of example 3 of the drilling apparatus;

FIG. 4 is a perspective view, with parts broken away, of example 4 of the drilling apparatus;

FIG. 5 is a side view of the drilling apparatus, showing the overall arrangement thereof.

DESCRIPTION OF THE PREFERRED EMBODIMENT

Figure 2:
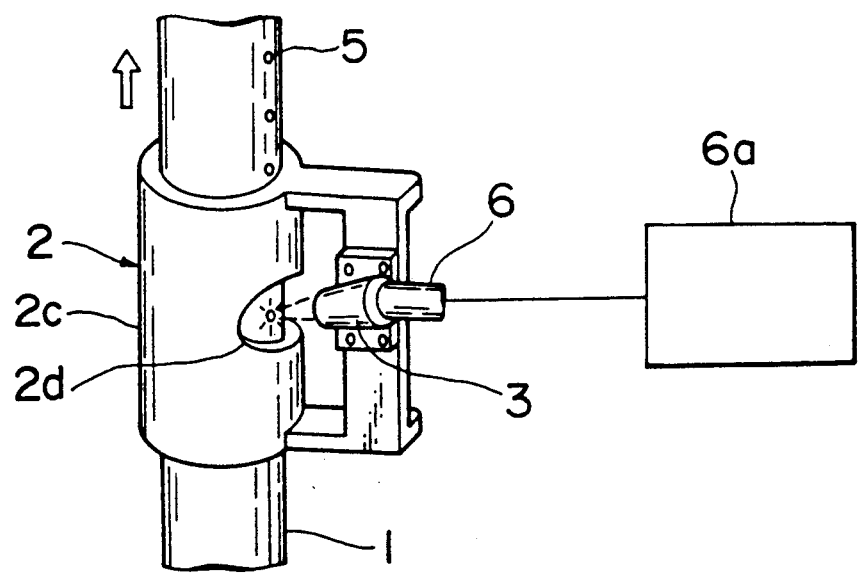

A tube having holes and a first method of manufacturing such a tube according to the present invention will be mainly described below with reference to FIGS. 1 and 2.

Examples of the method of manufacturing a tube having holes and a drilling apparatus will be described with reference to FIGS. 1 to 5.

EXAMPLE 1

Example 1 will be described below with reference to FIG. 1.

A seamless tube 1 formed of a flexible synthetic resin was prepared.

The tube 1 was retained in a tubular state by a tube retainer 2 such that its cross-section was circular. The tube retainer 2 has at least to ring members 2a and a base 2b connecting these ring members 2a. The inner diameter of each of the ring members 2a is substantially equal to the outer diameter of the tube 1. A laser beam irradiating portion 3 was mounted on the base 2b. The laser beam irradiating portion 3 was provided on the distal end of an optical fiber 6 for gathering a laser beam. The proximal end of the optical fiber 6 was connected to a laser beam generating device 6a.

The laser beam irradiating portion 3 was positioned on the side of the tube retainer 2 in such a manner that it could focus the laser beam on the surface of tube 1 retained by the tube retainer 2. The laser beam generating device 6a was of the type in which the material substantially formed of YAG was excited by light so that it generated near infrared rays of light. Such a laser beam generating device is capable of outputting a laser beam at a high level. It is to be noted, however, that other types of laser beam generating devices can also be employed in the present invention.

The apparatus shown in FIG. 1 is positioned beyond a tube molding machine so as to receive and retain a tube continuously forced out of the tube molding machine. The apparatus may be positioned at a position corresponding to that of the laser beam irradiating portion 3 shown in FIG. 5.

After having been forced out of a die 7, the tube 1 was cooled and fixed by an air cooling device 8. The tube 1 was fed in its longitudinal direction by a tube conveying portion 4 shown in FIG. 5, which was rotated at a predetermined speed so as to convey the tube 1 at a fixed speed.

The tube 1 was molded in a tubular state in which it enclosed air in it. However, in order to retain the tube more effectively, air may be blown into the tube from an air inlet 7a provided in the distal end of the die 7 so as to inflate the tube.

The synthetic resin that formed the portion of the tube 1 which was drilled contained 3 wt% of carbon black. As a result, absorption of energy with an infrared band was improved, and a drilling speed was increased.

Figure 6:
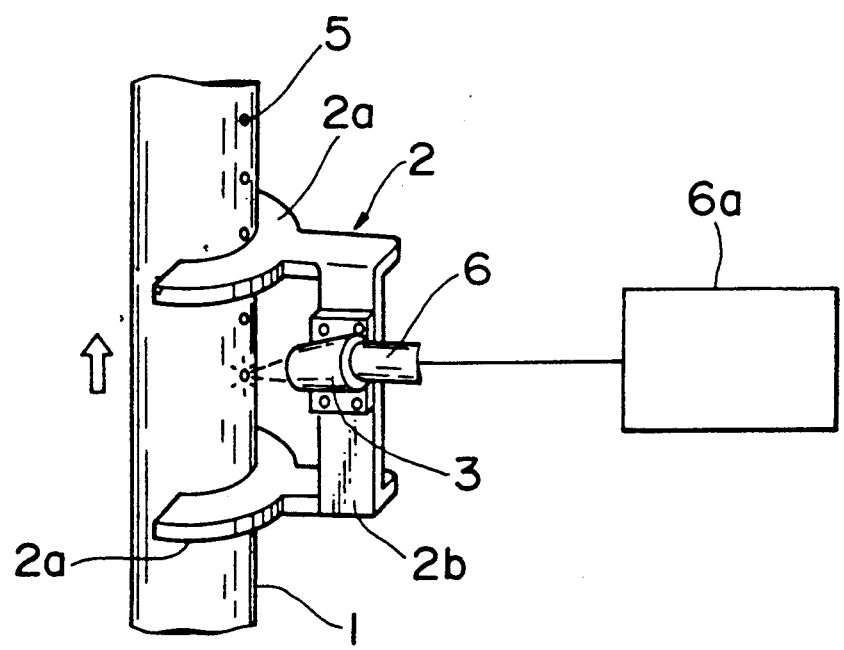
FIGS. 6 and 7 are perspective views of another examples.

Each of the ring members may be in a semicircular form, as shown in FIG. 6.

EXAMPLE 2

Example 2 will be described below with reference to FIG. 2.

As shown in FIG. 2, the tube retainer 2 consists of a cylindrical member 2C having a diameter substantially equal to the outer diameter of the tube 1. The cylindrical member 2c has a laser beam irradiation window 2d at which the laser beam irradiating portion 3 is positioned.

Figure 7:
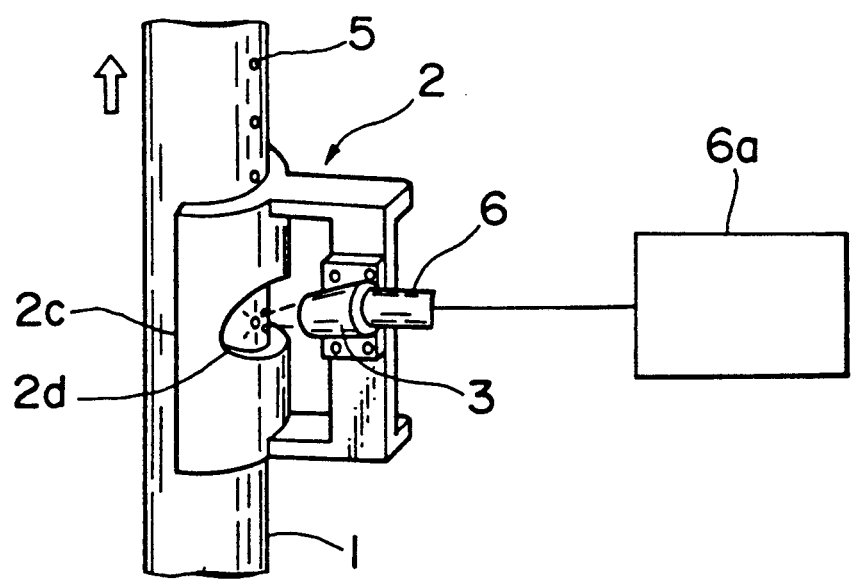

As shown in FIG. 7, the tube retainer 2 may also is comprised of a semicylindrical member.

EXAMPLE 3

Example 3 will be described below with reference to FIG. 3.

The tube 1 was manufactured by being forced through a die 7. Molten resin was forced through a ring-shaped nozzle 10. The tube 1 forced out of the ring-shaped nozzle 10 was retained from its inner side by the tube retainer 2 vertically provided at the center of the nozzle 10 so that it did not shake.

The tube retainer 2 was made of a cylindrical member having an outer diameter substantially the same as the inner diameter of the tube 1. The tube retainer 2 had a thin base. Since the tube retainer 2 also served as a cooling inside mandrel, the tube 1 was cooled and retained at the same time.

The same reference numerals were used to denote parts which were the same as those of Example 1, description thereof being omitted.

EXAMPLE 4

Example 4 will be described below with reference to FIG. 4.

The tube 1 was manufactured by the tube molding machine with the die 7 having the ring-shaped nozzle 10, and drilled at the same time, as in the case of Example 3. The tube retainer 2 was located inside the ring-shaped nozzle 10 so as to retain the tube forced out of the ring-shaped nozzle 10 from its inner side.

The tube retainer 2 employed in Example 4 had a pole 2e provided at the center of the nozzle 10 and two disk members 2f provided on the pole 2e, unlike the cooling inside mandrel employed Example 3. The outer diameter of the disk members 2f was the same as the inner diameter of the tube 1, and this allowed the tube 1 to be positioned precisely relative to the drilling laser beam irradiating portion 3.

A laser beam was focused between the two disk members 2f by the laser beam irradiating portion 3.

The tube retainer 2 may have more than two disk members 2f. In that case, the the laser beam emitted from the laser beam irradiating portion 3 may be focused on the portion of the tube 1 located above the uppermost disk member 2f.

Figure 5:
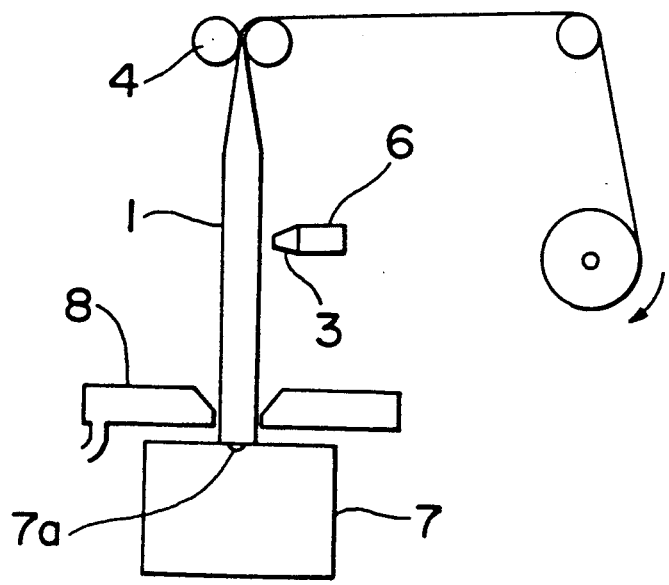

The tube 1 was conveyed by the tube conveying portion 4 consisting of two rollers which gripped the tube 1, as shown in FIG. 5.

OTHER EXAMPLES

Figure 4:
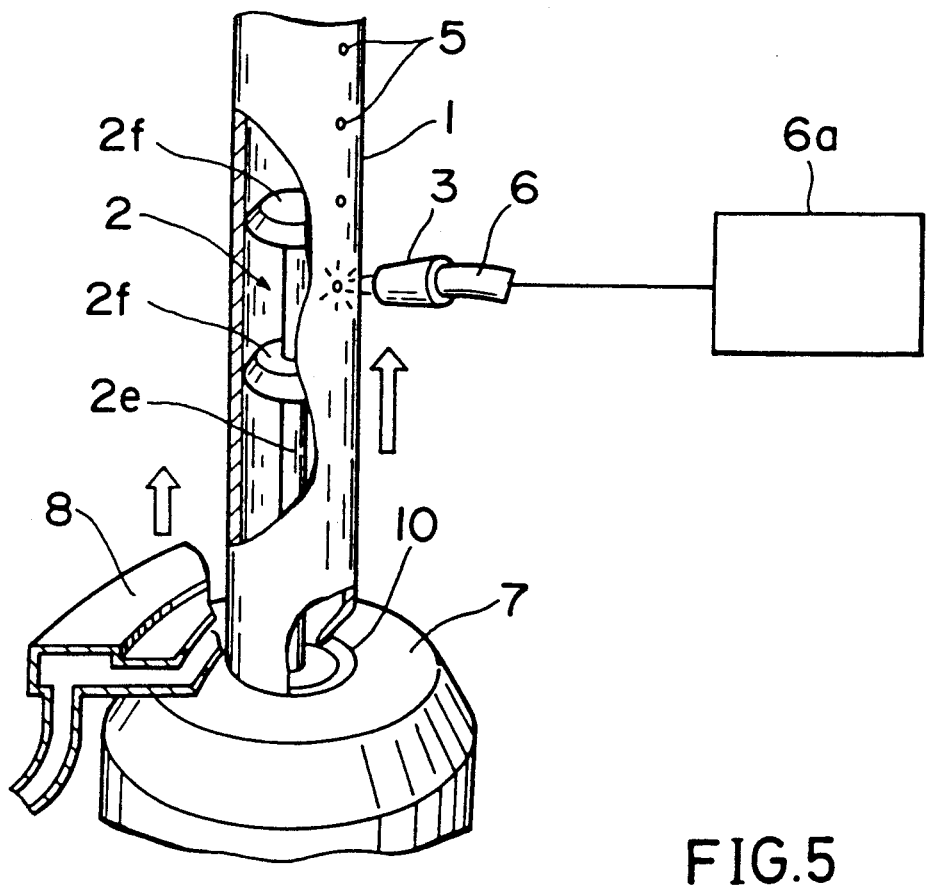

The tube retainer may consist of a combination of the tube retainer of Example 1 shown in FIG. 1 and the tube retainer of Example 3 shown in FIG. 3, a combination of the tube retainer of Example 2 shown in FIG. 2 and the tube retainer of Example 3 shown in FIG. 3, a combination of the tube retainer of Example 1 shown in FIG. 1 and the tube retainer of Example 4 shown in FIG. 4, a combination of the tube retainer of Example 2 shown in FIG. 2 and the tube retainer of Example 4 shown in FIG. 4, a combination of the tube retainers of Example 1, Example 3 and Example 4, or a combination of the tube retainers of Example 2, Example 3 and Example 4.

In the drilling apparatus shown in each of the aforementioned examples, the tube 1 may be drilled at intervals of 2.5 cm by conveying it at a speed of 10 cm/sec and irradiating the laser beam thereon at frequencies of 4 times/sec.

The laser beam which has passed one side of the tube 1 may reach the other side thereof. However, it does not form a hole on the other side of the tube 1, because it is not focused thereon. The drilling apparatus of Examples 3 and 4 is capable of manufacturing and drilling the tube 1 at the same time. Drilling is further facilitated in such an apparatus because the tube 1 has a relatively high temperature.

In the method of manufacturing a tube having holes and the drilling apparatus according to the present invention, the tube is continuously drilled by the laser beam focused on the side thereof while the tube is being conveyed in a tubular state. In consequence, selection of the position, the number and the size of holes is easy.

In the method of manufacturing a tube having holes and the drilling apparatus, the tube can be positioned precisely relative to the laser beam irradiating portion so as to achieve drilling of holes at precise positions. The method and the drilling apparatus are therefore suitable for use in manufacturing such tubes on a mass production basis.

The thus-obtained tube can be made into a seamless tube later which withstands hydraulic pressure excellently.

What is claimed is:

1. A method of manufacturing a tube having holes, comprising a step of:
   continuously drilling holes in a side of said tube at predetermined intervals by a laser beam focused thereon while said tube is being conveyed in its longitudinal direction in a tubular state and in a straight line state.

2. A method of manufacturing a tube having holes according to claim 1, further including a step of adding at least 0.5 wt% of carbon black during the molding of said tube.

3. A method of manufacturing a tube having holes according to claim 1, wherein said laser beam is emitted by a laser beam generating device in which an excited material containing yittrium aluminum garnet is excited by light so as to generate near infrared rays of light.

4. A method of manufacturing a tube having holes according to claim 1, wherein said tube is inflated by gas.

5. An apparatus for manufacturing a tube having holes, comprising:
   a tube retainer for retaining a tube in a tubular state and in a straight line state;
   a laser device having a laser beam irradiating portion disposed on a side of said tube at a position where it focuses a laser beam on the surface of said tube; and
   a tube conveying portion for conveying said tube in its longitudinal direction.

6. An apparatus for manufacturing a tube having holes according to claim 5, wherein said tube retainer has at least two ring or semicircular members having an inner diameter substantially equal to an outer diameter of said tube, and a base connecting said two ring or semicircular members with each other, and wherein said laser beam irradiating portion is disposed on said base in such a manner as to be directed toward the tube which passes through said tube retainer.

7. An apparatus for manufacturing a tube having holes according to claim 5, wherein said tube retainer is a cylindrical or semicylindrical member having an inner diameter substantially the same as an outer diameter of said tube, said cylindrical or semicylindrical member having a laser beam irradiation window, and wherein said laser beam irradiating portion is disposed in such a manner as to be directed toward said window.

8. An apparatus for manufacturing a tube having holes according to claim 5, wherein said tube retainer has at least two rings or semicircular members having an inner diameter substantially equal to an outer diameter of said tube, and a base connecting said two rings or semicircular members with each other, and wherein said laser beam irradiating portion is disposed on said base in such a manner as to be directed toward the tube which passes through said tube retainer; and
   wherein said tube retainer is provided subsequent to a tube molding machine for passing a continuously molded tube therethrough and thereby retaining said tube, and wherein said tube molding machine has a gas sending means for sending gas into said tube.

9. An apparatus for manufacturing a tube having holes according to claim 5, further including a tube molding machine with a die having a ring-shaped nozzle, and wherein said tube retainer is provided inside said ring-shaped nozzle so as to retain the tube forced out of said ring-shaped nozzle from inner side thereof.

10. A method of manufacturing a tube having holes, comprising:
    continuously drilling holes in a side of said tube at predetermined intervals by a laser beam focused thereon while said tube is being conveyed in its longitudinal direction in a tubular state; and
    further including a step of adding at least 0.5% by wt of carbon black during the molding of said tube.

11. A method of manufacturing a tube having holes to claim 10, wherein said laser beam is emitted by a laser beam generating device in which an excited material containing yttrium aluminum garnet is excited by light so as to generate near infrared rays of light.

12. A method of manufacturing a tube having holes, comprising:
    continuously drilling holes in a side of said tube at predetermined intervals by a laser beam focused thereon while said tube is being conveyed in its longitudinal direction in a tubular state, said tube being inflated by gas so that it can be held in a tubular state.

13. An apparatus for manufacturing a tube having holes, comprising:
    a tube retainer for retaining a tube in a tubular state;
    a laser device having a laser beam irradiating portion disposed on a side of said tube at a position where it focuses a laser beam on the surface of said tube; and
    a tube conveying portion for conveying said tube in its longitudinal direction;
    wherein said tube retainer has at least two rings or semicircular members having an inner diameter substantially equal to an outer diameter of said tube, and a base connecting said two ring or semicircular members with each other, and wherein said laser beam irradiating portion is disposed on said base in such a manner as to be directed toward the tube which passes through said tube retainer.

14. An apparatus for manufacturing a tube having holes, comprising:
    a tube retainer for retaining a tube in a tubular state;
    a laser device having a laser beam irradiating portion disposed on a side of said tube at a position where it focuses a laser beam on the surface of said tube; and
    a tube conveying portion for conveying said tube in its longitudinal direction;
    wherein said tube retainer is a cylindrical or semicylindrical member having an inner diameter substantially the same as an outer diameter of said tube, said cylindrical or semicylindrical member having a laser beam irradiation window, and wherein said laser beam irradiating portion is disposed in such a manner as to be directed toward said window.

15. An apparatus for manufacturing a tube having holes according to claim 13, wherein said tube retainer is provided subsequent to a tube molding machine for passing a continuously molded tube therethrough and thereby retaining said tube, and wherein said tube molding machine has a gas sending means for sending gas into said tube.

16. An apparatus for manufacturing a tube having holes according to claim 14, wherein said tube retainer is provided subsequent to a tube molding machine for passing a continuously molded tube therethrough and thereby retaining said tube, and wherein said tube molding machine has a gas sending means for sending gas into said tube.

17. An apparatus for manufacturing a tube having holes, comprising:
- a tube retainer for retaining a tube in a tubular state;
- a laser device having a laser beam irradiating portion disposed on a side of said tube at a position where it focuses a laser beam on the surface of said tube; and
- a tube conveying portion for conveying said tube in its longitudinal direction;
- further including a tube molding machine with a die having a ring-shaped nozzle, and wherein said tube retainer is provided inside said ring-shaped nozzle so as to retain the tube forced out of said ring-shaped nozzle from the inner side thereof.

18. A method of manufacturing a tube having holes according to claim 1, further including a step of adding at least 0.5% by wt of carbon black during the molding of said tube and wherein said laser beam is emitted by a laser beam generating device in which an excited material containing yttrium aluminum garnet is excited by light so as to generate near infrared rays of light.

19. An apparatus for manufacturing a tube having holes according to claim 5, wherein said tube retainer is a cylindrical or semicylindrical member having an inner diameter substantially the same as an outer diameter of said tube, said cylindrical or semicylindrical member having a laser beam irradiation window, and wherein said laser beam irradiating portion is disposed in such a manner as to be directed toward said window; and wherein said tube retainer is provided subsequent to a tube molding machine for passing a continuously molded tube therethrough and thereby retaining said tube, and wherein said tube molding machine has a gas sending means for sending gas into said tube.

* * * * *